United States Patent [19]

Palmer

[11] 4,398,795
[45] Aug. 16, 1983

[54] FIBER OPTIC TAP AND METHOD OF FABRICATION

[75] Inventor: John P. Palmer, Pomona, Calif.

[73] Assignee: General Dynamics, Pomona Division, Pomona, Calif.

[21] Appl. No.: 227,756

[22] Filed: Jan. 23, 1981

Related U.S. Application Data

[63] Continuation of Ser. No. 15,027, Feb. 26, 1979, abandoned.

[51] Int. Cl.³ .............................................. G02B 5/14
[52] U.S. Cl. .................................. 350/96.19; 156/158
[58] Field of Search ............... 350/96.15, 96.16, 96.19; 156/158

[56] References Cited

U.S. PATENT DOCUMENTS

| | | | |
|---|---|---|---|
| 3,508,589 | 4/1970 | Derick et al. ........................ | 139/420 |
| 3,610,727 | 10/1971 | Ulrich ................................ | 350/96.19 |
| 3,614,198 | 10/1971 | Martin et al. ...................... | 350/96.19 |
| 3,777,149 | 12/1973 | Marcatili ............................ | 350/96.15 |
| 3,872,236 | 3/1975 | Swengel, Sr. et al. ........... | 350/96.15 |
| 3,901,582 | 8/1975 | Milton ................................ | 350/96.16 |
| 3,905,676 | 9/1975 | Ulrich ................................ | 350/96.19 |
| 3,933,410 | 1/1976 | Milton ................................ | 350/96.16 |
| 3,982,123 | 9/1976 | Goell et al. ........................ | 350/96.15 |
| 4,021,097 | 5/1977 | McMahon ......................... | 350/96.15 |
| 4,054,366 | 10/1977 | Barnoski et al. .................. | 350/96.15 |
| 4,087,156 | 5/1978 | Kao ..................................... | 350/96.21 |
| 4,089,584 | 5/1978 | Polcynski ........................... | 350/96.16 |
| 4,103,154 | 7/1978 | D'Auria ............................. | 350/96.15 |
| 4,136,929 | 1/1979 | Suzaki ................................ | 350/96.15 |

OTHER PUBLICATIONS

Fujita et al., "Optical Fiber Wave Splitting Coupler", *Applied Optics*, vol. 15(9), p. 2031, Sep. 1976.
*Electronics Letters*, vol. 14, May 25, 1978, Minemura et al., "Two-Way Transmission Experiments Over a Single Optical Fiber . . .".
*Applied Optics*, vol. 17, p. 3248, Oct. 15, 1978, Drake, "Multimode Fiber Optics Coupler with Low Insertion Loss".
*Applied Optics*, vol. 16, p. 1794, Jul. 1977, Kawasaki et al., "Low Loss Access Coupler . . .".
EASCON-76 Conf. Proceedings, 119 (1976), Barnoski et al., "Components for Single Strand Fiber Systems".
*Electronics Letters*, 14, p. 157, Mar. 2, 1978, Tsujimoto, "Fabrication of Low-Loss 3dB Couplers with Multimode Optical Fibers".
*Applied Optics*, 17, 2215, Jul. 15, 1978, Karr et al., "Lightwave Fiber Tap".
IEEE Transactions on Microwave Theory and Techniques, MTT23, 179, Jan. 1975, Kawahara et al., "A Semi-Transparent Mirror-Type Directional Coupler".
IEEE Trans. on Microwave Theory and Techniques, MTT23, 1978, Jan. 1975, Kawahara et al., "Power Transfer of a Parallel Optical Fiber . . .".
*Electronic Letters*, 12, 567, Oct. 14, 1976, Gambling et al., "Radiation from Curved Single-Mode Fibers".
*Applied Optics*, vol. 15, No. 10, Oct. 1976, pp. 2310–2312, H. P. Hsu et al., "Single Mode Optical Fiber Pickoff Coupler".

*Primary Examiner*—John D. Lee
*Assistant Examiner*—Frank González
*Attorney, Agent, or Firm*—Henry M. Bissell; Edward B. Johnson

[57] ABSTRACT

A low-loss fiber optic tap is fabricated by mounting a portion of an optical fiber with epoxy resin along the curved surface of a solid support form. After curing of the epoxy, a planar surface extending partially into and along the fiber is established by lapping and polishing the device to a carefully controlled depth. A prism having a preferred characteristic angle of 70° is attached to the planar surface along the optical fiber and a photodiode is mounted adjacent thereto. The disclosure teaches how the parameters of the device may be tailored to the specific signal tap requirements of particular fiber optic transmission lines.

16 Claims, 7 Drawing Figures

FIBER OPTIC TAP AND METHOD OF FABRICATION

This is a continuation, of application Ser. No. 015,027, filed Feb. 26, 1979.

CROSS-REFERENCE TO RELATED APPLICATION

This application discloses structure and fabrication techniques which are similar to those disclosed in my application Ser. No. 015,026, filed concurrently herewith, entitled FIBER OPTIC COUPLER AND METHOD OF FABRICATION (now abandoned).

BACKGROUND OF THE INVENTION

1. Field of the Invention

This invention relates to fiber optic transmission lines and, more particularly, to devices for attachment to optical fibers for monitoring a predetermined portion of the light being transmitted therein.

2. Description of the Prior Art

The field of fiber optics has progressed in a relatively few years from laboratory curiosities and decorative pieces to present-day systems of high sophistication for optical communication and data transmission. Optical fibers—so-called "light pipes"—are specially fabricated filaments which exhibit the property of transmitting light longitudinally along a flexible axis. Various materials which are used in the fabrication of optical fibers and the particular properties thereof are described for example in the Derick et al U.S. Pat. No. 3,508,589 and in further detail in British patent No. 1,037,498, cited therein.

Low-loss fiber optic taps are important components for fiber optic data links and data buses. This is so because it is desirable to be able to tap a portion of a signal propagating through an optical fiber without breaking or terminating the fiber, since fiber terminations add unwanted optical losses to a system and unfavorably increase the need for highly precise fiber splicing and interconnecting arrangements. Since fiber optic transmission lines having a large number of signal taps are inherently power-starved, it is important to minimize excess losses associated with these components. Furthermore, it is desirable to have taps which can be fabricated so that that the tap ratio (the power out of the tap divided by the power into the fiber) can be tailored conveniently to the unique requirements of a given system.

Efficient fiber optic taps have been reported previously whereby two fibers are cleaved, or ground and polished, at specific angles and butt jointed. See for example Karr et al, "Lightwave Fiber Tap", *Applied Optics*, Vol. 17, page 2215 (July 15, 1978) and Kuwarhara et al, "A Semi-Transparent Mirror-Type Directional Coupler for Optical Fiber Applications", *IEEE Transactions on Microwave Theory and Technique*, Vol. 23, page 179 (January, 1975). In these examples, the tap ratio is variable either by changing the cleavage angle or by using materials with different indices of refraction between the cleaved surfaces. However, devices fabricated by such methods are very fragile and are not easily reproduced with sufficient accuracy.

It has been demonstrated that when an optical fiber is bent in the form of an arc, there is an increased tendency for light to escape from the bent region in a radiation pattern which is primarily in the plane of the bend and which is directed away from the center of curvature. See for example Gambling et al, "Radiation From Curved Single-Mode Fibres", *Electronics Letters*, Vol. 12, page 567 (Oct. 14, 1976); and Goell et al U.S. Pat. No. 3,982,123. The tendency for light to escape from the bent region of the fiber is enhanced when a flat region is lapped and polished on the fiber surface perpendicular to the radius of the bend in the fiber. The Polczynski U.S. Pat. No. 4,089,584 discloses optical taps coupled to a single optical fiber in a straight configuration with one planar side formed along the fiber core. The McMahon U.S. Pat. No. 4,021,097 discloses an optical coupling apparatus in which a bundle of side-by-side optical fibers formed in a ribbon are curved, lapped and joined to an adjacent slab of light propagating material having a related refractive index. This slab waveguide is extremely thin (comparable to the thickness of the optical fibers) and therefore is difficult to fabricate and very fragile.

A specific combination of a photodiode which is sealed to a single optical fiber for supplying electrical signal characteristics of incident optical energy is disclosed in d'Auria et al U.S. Pat. No. 4,103,154.

The use of prisms for coupling light with optical transmission systems is well known as exemplified for example by U.S. Pat. Nos. 3,610,727 of Ulrich 3,614,198 of Martin et al, 3,901,582 of Milton, and 3,905,676 of Ulrich.

SUMMARY OF THE INVENTION

In brief, devices and fabrication methods of the present invention involve the use of a sold form to support and bend an optical fiber from which a predetermined portion of the incident light is to be tapped from the fiber. The form is machined from a solid material, such as aluminum, and has one curved side with a radius of curvature between 5 and 8 cm., preferably 6 cm. A coating of epoxy resin is placed on the curved surface of the form, and the fiber is placed in the epoxy and is constrained to the curvature of the form. After the epoxy has been cured, and a plurality of forms so prepared, the forms are mounted on a lapping and polishing fixture. The loose fiber ends are secured to the fixture to prevent breakage of the fibers. A flat surface is lapped into the epoxy, and eventually a small region of the glass fiber, embedded in the epoxy, becomes exposed. Lapping of a flat surface into the fiber (and epoxy) continues until the desired amount of material has been removed. The depth of removal of fiber core is monitored by measuring the length and width of the flat region on the fiber. This measurement is made using a microscope with a micrometer-actuated X-Y stage. The depth of fiber removal is controlled routinely to an accuracy of ±10 micrometers and preferably to an accuracy of ±2 micrometers. The lapped surface is then polished using the same support fixture on a second machine which uses a fine (¼ micron) polishing compound.

The complete device comprising the invention includes a prism for directing the light from the fiber to an associated photodiode detector. The prism to be assembled on the fiber element has a preferred characteristic angle equal to 70°. The other angles of the prism are not significant. However, the performance of the coupler is strongly dependent on the angle of the face of the prism through which light exits in the direction of the photodiode. At an angle of 70±5°, the exiting beam is narrow and highly collimated. For a curvature of radius 6 cm., the angle may be 70±3°. With this arrangement, nearly all of the light which is coupled out of the fiber is incident on the active area of the photodiode.

The associated photodiode is either cemented directly to the prism, using an optically transparent epoxy, or is supported near the prism so that the light leaving the fiber is directed toward the photodiode. The photodiode can be packaged in a standard header/lid assembly using a lid with a window in it. More specifically, the photodiode can be packaged in a hybrid microelectronic assembly whereby a preamplifier is included in the assembly and a window is provided in the packaged lid.

The fiber/prism/photodiode assembly is preferably mounted rigidly in a suitable package such as an aluminum box or a molded enclosure, either of which supports a pair of opposed optical connectors and an electrical connector needed to interface the device. In such an embodiment, the radiating light which is tapped from the fiber is highly localized and highly collimated by virtue of the coupling from the flat region of the bent fiber to the photodiode using the described optical prism.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
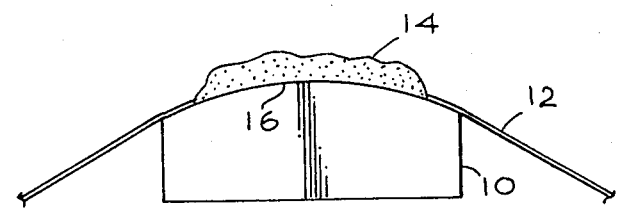
FIG. 1 is a view of a portion of one embodiment of the invention in a preliminary stage of fabrication.
Figure 2:
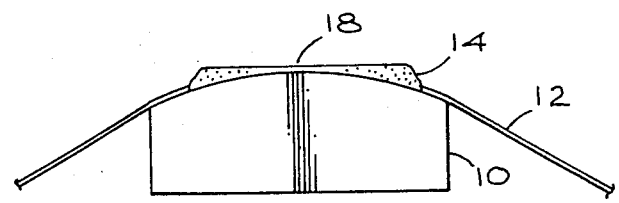
FIG. 2 is a view of the portion of FIG. 1, following a succeeding step in the fabrication process.

FIG. 1 illustrates a form 10 to which an optical fiber 12 is affixed by cured and hardened epoxy resin 14. The form 10 is machined from solid material, such as aluminum, to develop a curved side 16 with a circular arc having a radius of curvature between 5 and 8 cm, preferably of 6 cm. Sufficient epoxy is applied to result in an adequate support surface when the part is lapped, as shown in FIG. 2. After the epoxy 14 has been cured, the form 10 with fiber 12 attached, together with a plurality of other forms and fibers which have been similarly prepared, is mounted on a lapping and polishing fixture (not shown). In this step, the loose ends of the fibers 12 are secured to the fixture to prevent breakage. A flat surface 18 is lapped into the epoxy 14, as shown in FIG. 2. During lapping in this fashion, a small region of the fiber 12 becomes exposed and lapping of the flat surface 18 continues into the fiber 12 and epoxy 14 until the predetermined amount of fiber has been removed. The depth of penetration of the fiber core is monitored by measuring the length and width of the portion of the surface 18 along the fiber 12. This measurement is made using a microscope and the depth of fiber removal is controlled routinely to an accuracy of ±10 micrometers, preferably to within ±2 micrometers. If the radius of fiber curvature is less than about 4 cm, the fiber 12 tends to crack as soon as the lap cuts through the buffer coating or cladding (not shown) which surrounds the fiber 12. Therefore, the preferred radius of curvature for the fiber 12 is determined by the curved surface 16 of the form 10 is 6 cm. After lapping, the flat surface 18 is polished, using ¼ micon particle size polishing compound.

Figure 3:
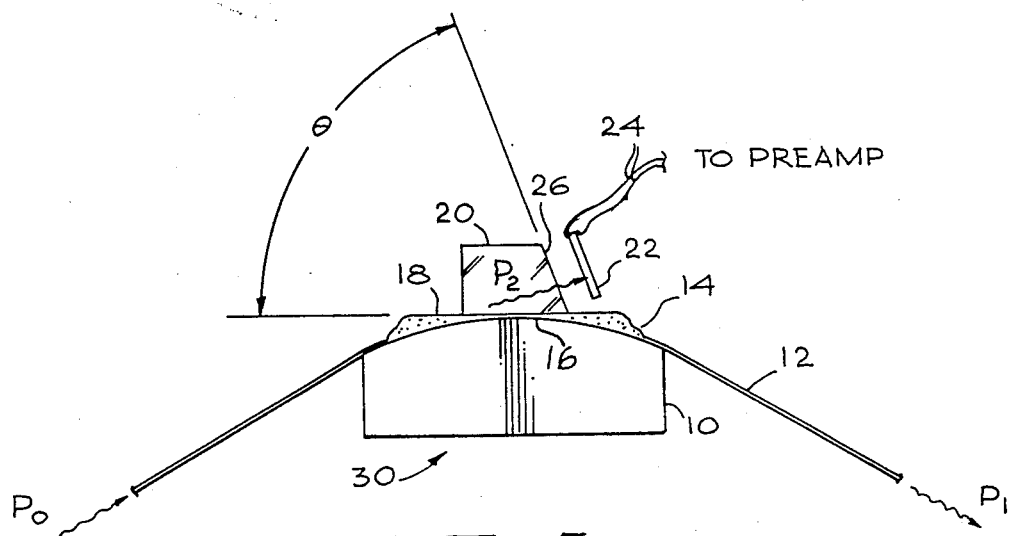
FIG. 3 is a schematic view of one particular embodiment of the invention.

FIG. 3 represents the combination of FIG. 2 with a prism 20 affixed by means of an optically transparent epoxy to the lapped and polished surface 18 for directing a tapped portion of the light from the fiber 12 to an associated photodiode 22 having connecting leads 24 directed to a preamplifier (not shown). As indicated in FIG. 3, the optical power level $P_o$ divides by virtue of the tap arrangement of FIG. 3 into an output power level $P_1$ continuing along the fiber 12 and a tapped power level $P_2$ which is directed to the photodiode 22. The tap ratio is defined as the power out of the tap divided by the power into the fiber. A good tap ratio is one that provides sufficient tap output power so that low level detection is not necessary, but not enough output to contribute to a large insertion loss.

The prism 20 (see FIG. 3) is selected to have a characteristic angle $\theta$, the angle between the plane of the surface 18 and the face 26 adjacent the photodiode 22, of preferably 70°. For the angle $\theta$ of 70±5°, the beam directed to the photodiode 22 is narrow and is highly collimated. The prism 20 is bonded to the flat region of the fiber 12 in the planar surface 18 using an optically transparent epoxy. The angle $\theta$ for the prism 20 is critical to efficient coupling between the fiber 12 and the photodiode 22. The optimum value for this angle is related to the radius of curvature of the fiber 12 as determined by the surface 16 of the form 10. For a radius of curvature of 6 cm, the optimum value of $\theta$ is 70±3°. Within this range of angles, the insertion loss, including reflection from exit surfaces, is less than −1.0 dB. With such a tap device, the far-field beam pattern exiting from the prism 20 is elliptical with an angle of divergence nearly the same as that of the beam exiting from a cleaved fiber.

Figure 4:
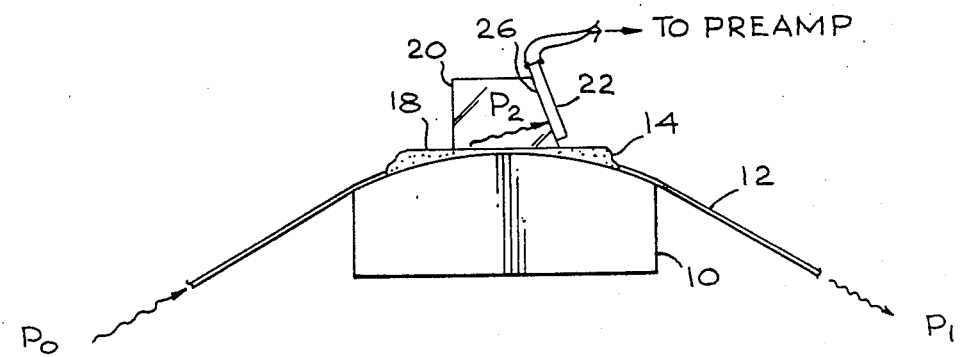
FIG. 4 is a view similar to that of FIG. 3 but showing a modification thereof.

FIG. 4 illustrates a variation of the assembly of FIG. 3 in which the photodiode 22 is mounted along the face 26 of the prism 20, the assembly being otherwise the same as that shown in FIG. 3. In FIG. 4, the photodiode 22 is cemented to the prism 20, using an optically transparent epoxy.

Figure 5:
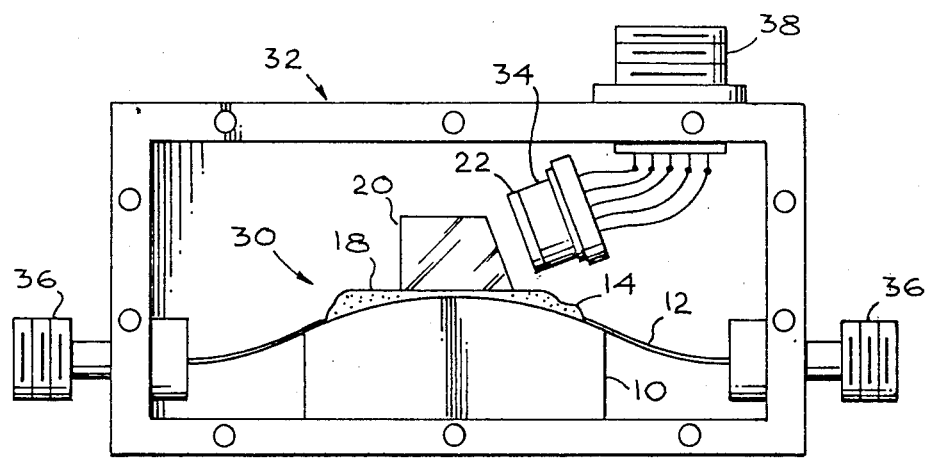
FIG. 5 is a view of a finished device in accordance with the invention.

FIG. 5 illustrates a finished tap unit in accordance with the invention in which the fiber/prism/photodiode assembly of FIG. 3 is mounted rigidly in an aluminum box 32 (shown with the cover removed). The assembly 30 is as shown in FIG. 3 except that the photodiode is integrated with an associated preamplifier 34 in a single unit. The ends of the fiber 12 are connected to respective optical connectors 36 and an electrical connector 38 is provided for the preamplifier circuitry.

Figure 6:
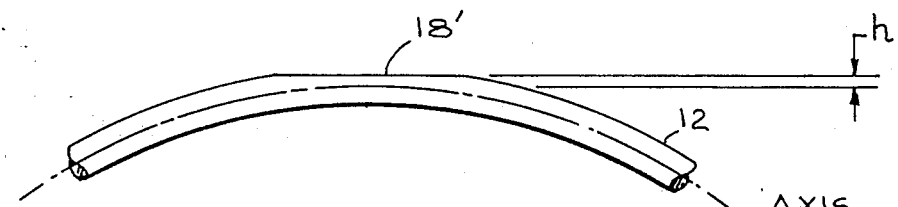
FIG. 6 represents a portion of an element employed in the present invention.

The performance and operating characteristics of a fiber optic tap in accordance with the present invention may be further described by reference to FIGS. 6 and 7. As indicated in FIG. 6, which schematically represents a portion of the fiber 12 lapped to provide a planar surface 18', the dimension h is the distance from the fiber axis to the flat surface 18'. This dimension affects both performance parameters of the fiber optic tap, i.e. the tap ratio $\gamma$, expressed in equation (1) as follows:

$$\gamma = 10 \log P_2/P_1 \, (dB) \tag{1}$$

and the loss factor $\eta$ which is defined in equation (2) as follows:

$$\eta = 10 \log (P_1 + P_2)/P_o \, (dB) \tag{2}$$

where the power levels $P_o$, $P_1$ and $P_2$ represent the optical signals depicted in FIG. 3. These two parameters $\gamma$ and $\eta$ vary according to the depth of lapping into the fiber 12 at the center of the curved portion of the fiber and both parameters may be expressed in terms of the dimension h.

Figure 7:
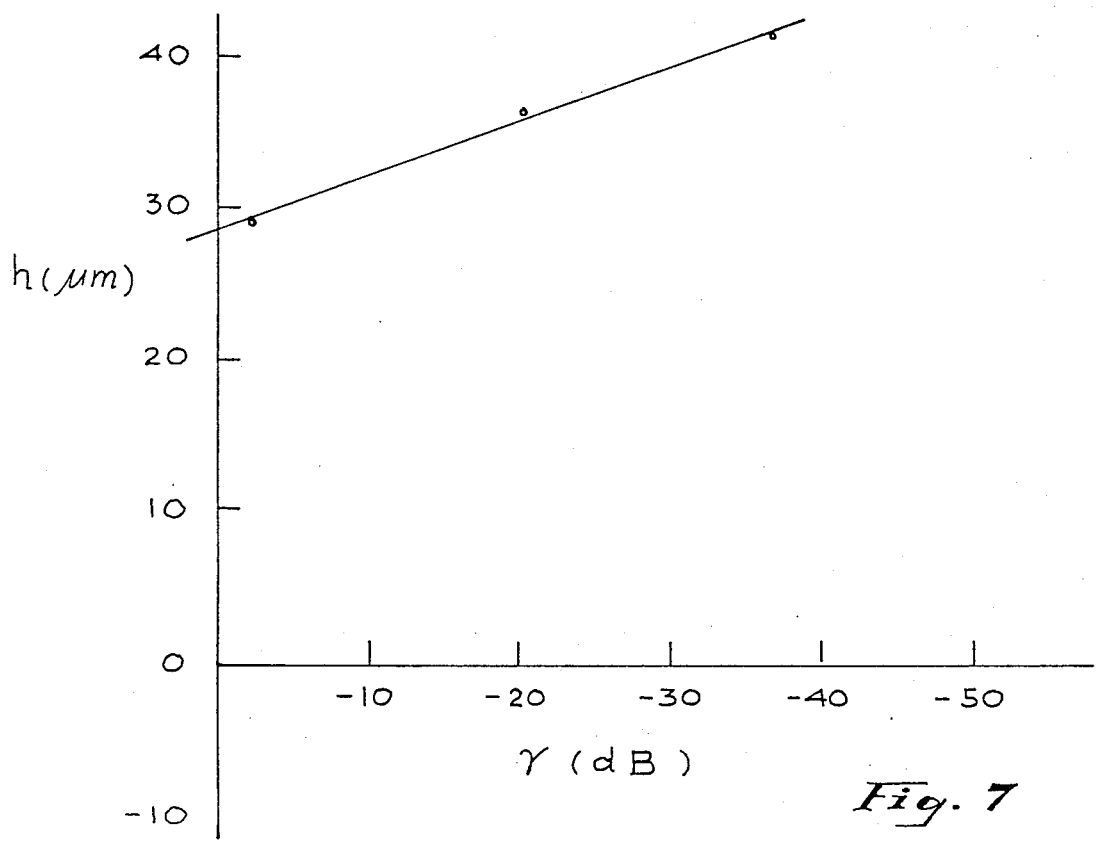
FIG. 7 is a graph illustrating particular operating characteristics of arrangements in accordance with the invention.

A plot showing the relationship of h and $\gamma$ as observed for one particular embodiment of the invention is shown in FIG. 7. This illustrates that the tap ratio is quite low when the depth of the lapped surface does not reach the core of the fiber (the fiber having a core diameter of 60 micrometers). However, 50% of the light is coupled to the photodiode by the tap when the lapped surface is 1 to 2 micrometers below the edge of the core. The fraction of light coupled to the photodiode by the tap continues to increase until all of the light is coupled to the photodiode and none continues in the fiber. The loss factor for the tap is less than $-1.0$ dB for the range of data represented in FIG. 7.

Particular arrangements in accordance with the present invention provide a fiber optic tap which is compact, rugged, reproducible and is adaptable by varying the fabrication process in accordance with the teaching of the invention to accommodate specific signal tap requirements of fiber optic transmission lines. This results in a fiber optic tap of high efficiency and one which is capable of providing a wide range of tap ratios to meet specific coupling needs. The light radiated from the tap is highly localized and highly collimated by virtue of the particular combination of the prism and other structural arrangement fabricated according to the invention.

Although there have been described above specific arrangements of a fiber optic tap and methods of fabrication thereof in accordance with the invention for the purpose of illustrating the maner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A fiber optic tap device for tapping off a predetermined portion of optical power from a single optical fiber and directing same to a photodiode, which device comprises:
a curved form for supporting an optical fiber and shaping a portion thereof to a predetermined segment of a circle;
a single optical fiber;
means comprising epoxy resin enclosing the optical fiber along a portion thereof to affix it to a curved portion of the form of selected radius of curvature, the epoxy resin and a center section of the curved portion of the fiber being lapped and polished to a preselected depth of penetration into the fiber to develop a common planar surface along the fiber and the epoxy resin;
a prism having a predetermined characteristic angle affixed to said planar surface, the prism being supported on the epoxy resin and in contact with the optical fiber by means of an optically transparent epoxy, the radius of curvature and characteristic angle being selected to provide an insertion loss less than $-1.0$ dB; and
a photodiode and associated circuitry, the photodiode being positioned adjacent the prism to receive and monitor light transmitted by the prism from the optical fiber.

2. The device of claim 1 further comprising a pair of optical connectors coupled to opposite ends of the fiber, an electrical circuit connector, means coupling the circuit connector to the photodiode, and an enclosure supporting the form, the photodiode, and the connectors in operative relationship.

3. The device of claim 2 wherein the coupling means comprises a preamplifier stage integrated with the photodiode in a single unit.

4. The device of claim 1 wherein the radius of curvature of the curved portion of the form and of the portion of the optical fiber affixed thereto is selected to be between 5 and 8 cm.

5. The device of claim 4 wherein said radius of curvature is 6 cm.

6. The device of claim 1 wherein the photodiode is separate from the prism but mounted adjacent thereto so that light passing through the prism from the fiber is directed toward the photodiode.

7. The device of claim 1 wherein the material of the form is aluminum.

8. The device of claim 1 wherein the lapped planar surface of the epoxy and optical fiber portion is between 1 and 2 micrometers below the edge of the core of the optical fiber so that the tap couples 50% of the light from the fiber to the photodiode.

9. A fiber optic tap device for tapping off a predetermined portion of optical power from a single optical fiber and directing same to a photodiode, which device comprises:
a curved form for supporting an optical fiber and shaping a portion thereof to a predetermined segment of a circle;
a single optical fiber positioned along the curved surface of the form;
means comprising epoxy resin encasing the optical fiber along a portion thereof to affix it to a curved portion of the form of selected radius of curvature, the epoxy resin and a center section of the curved portion of the fiber being lapped and polished to a preselected depth of penetration into the fiber to develop a common planar surface along the fiber and the epoxy resin which extends beyond the lapped center section of the fiber;
a prism having a predetermined characteristic angle affixed to said planar surface, the prism being supported on the epoxy resin and in contact with the optical fiber by means of an optically transparent epoxy, the radius of curvature and characteristic angle being selected to provide an insertion loss less than $-1.0$ dB;
a photodetector positioned adjacent the prism to receive and monitor light transmitted by the prism from the optical fiber directly to the photodetector without internal reflection within the prism and to provide electrical signals corresponding thereto; and electrical circuitry connected to the photodetector for processing said electrical signals.

10. A fiber optic tap device for tapping off a predetermined portion of optical power from a single optical fiber and directing same to a photodiode, which device comprises:
a curved form for supporting an optical fiber and shaping a portion thereof to a predetermined segment of a circle;
a single optical fiber;
means comprising epoxy resin enclosing the optical fiber along a portion thereof to affix it to a curved portion of the form of selected radius of curvature, the radius being selected to be between 5 and 8 cm, the epoxy resin and a center section of the curved portion of the fiber being lapped and polished to a preselected depth of penetration into the fiber to develop a common planar surface along the fiber and the epoxy resin;
a prism having a predetermined characteristic angle selected to be 70+/−5° and affixed to said planar surface, the prism being supported on the epoxy resin and in contact with the optical fiber by means of an optically transparent epoxy; and
a photodiode and associated circuitry, the photodiode being positioned adjacent the prism to receive and monitor light transmitted by the prism from the optical fiber.

11. The device of claim 10 wherein said radius of curvature is 6 cm and the characteristic angle is 70 +/−3°.

12. The method of fabricating an optical fiber tap comprising:
machining a solid form to develop a curved side having a preselected radius of curvature in excess of 4 cm;
affixing an optical fiber to the form along the curved side thereof by means of an epoxy resin which totally encloses a central portion of the fiber adjacent the form;
lapping the epoxy and a portion of the fiber mounted therein to develop a co-planar surface extending to a predetermined depth into the core of the fiber and along the adjacent epoxy resin;
polishing the lapped surface;
selecting a prism having a characteristic angle of a preselected value and mounting one face of the prism to the co-planar surface of the fiber and epoxy resin using an optically transparent epoxy, the radius of curvature and characteristic angle being selected to provide an insertion loss less than −1.0 dB; and
mounting a photodiode adjacent the light exiting face of the prism in a position to receive light directed from the fiber by the prism.

13. The method of claim 12 further comprising the step of cementing the photodiode directly to the light exiting face of the prism by means of an optically transparent epoxy.

14. The method of fabricating an optical fiber tap comprising:
machining a solid form to develop a curved side having a preselected radius of curvature in excess of 4 cm;
positioning an optical fiber along the curved side of the form;
applying an epoxy resin in an amount sufficient to totally enclose a central portion of the fiber adjacent the form and extend along the form in all directions from the central portion of the fiber;
lapping the epoxy and a portion of the fiber mounted therein to develop a co-planar surface extending to a predetermined depth into the core of the fiber and along the adjacent epoxy resin;
polishing the lapped surface;
selecting a prism having a characteristic angle matching the preselected radius of curvature in order to develop, for the finished optical fiber tap device, an insertion loss of less than −1.0 dB;
mounting one face of the prism to the co-planar surface of the fiber and epoxy resin using an optically transparent epoxy; and
mounting a photodetector adjacent the light exiting face of the prism in a position to receive light directed from the fiber by the prism.

15. A method of fabricating an optical fiber tap comprising:
machining a solid form to develop a curved side having a preselected radius of curvature in excess of 4 cm;
affixing an optical fiber to the form along the curved side thereof by means of an epoxy resin which totally encloses a central portion of the fiber adjacent the form;
lapping the epoxy and a portion of the fiber mounted therein to develop a co-planar surface extending to a predetermined depth into the core of the fiber and along the adjacent epoxy resin;
polishing the lapped surface;
selecting a prism having a characteristic angle of 70 +/−5° and mounting one face of the prism to the co-planar surface of the fiber and epoxy resin using an optically transparent adhesive; and
mounting a photodiode adjacent the light exiting face of the prism in a position to receive light directed from the fiber by the prism.

16. The method of claim 15 wherein the radius of curvature is 6 cm. and the prism is selected to have a characteristic angle of 70 +/−3°.

* * * * *